United States Patent
Huang

(10) Patent No.: US 7,233,875 B2
(45) Date of Patent: Jun. 19, 2007

(54) TEST SET FOR TESTING A DEVICE AND METHODS FOR USE THEREWITH

(75) Inventor: Lawrence Huang, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 19 days.

(21) Appl. No.: 11/284,655

(22) Filed: Nov. 21, 2005

(65) Prior Publication Data

US 2007/0118321 A1 May 24, 2007

(51) Int. Cl.
*G06F 19/00* (2006.01)
(52) U.S. Cl. .......................... 702/117; 714/25
(58) Field of Classification Search ............... 702/117, 702/118, 182–185, 188; 714/774, 25, 26
See application file for complete search history.

(56) References Cited

U.S. PATENT DOCUMENTS

2006/0156198 A1* 7/2006 Boyce et al. ............... 714/774

* cited by examiner

*Primary Examiner*—Edward Raymond
(74) *Attorney, Agent, or Firm*—Garlick Harrison & Markison; Bruce E. Stuckman

(57) ABSTRACT

A test set for testing a device includes a protocol encoder for formatting a plurality of test data in accordance with a channel protocol to create formatted data. A channel encoder encodes the formatted data in accordance with at least one analog channel parameter and at least one analog perturbation parameter to form a link signal. A first link interface produces a channel signal that is coupled to the device. A second link interface generates a received signal that is based on the channel signal.

31 Claims, 10 Drawing Sheets

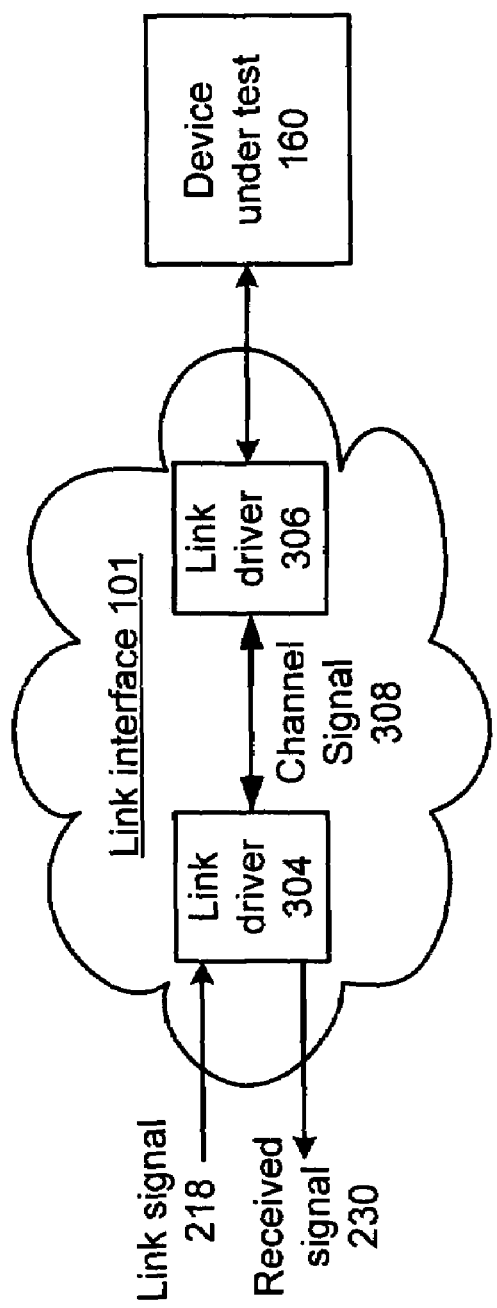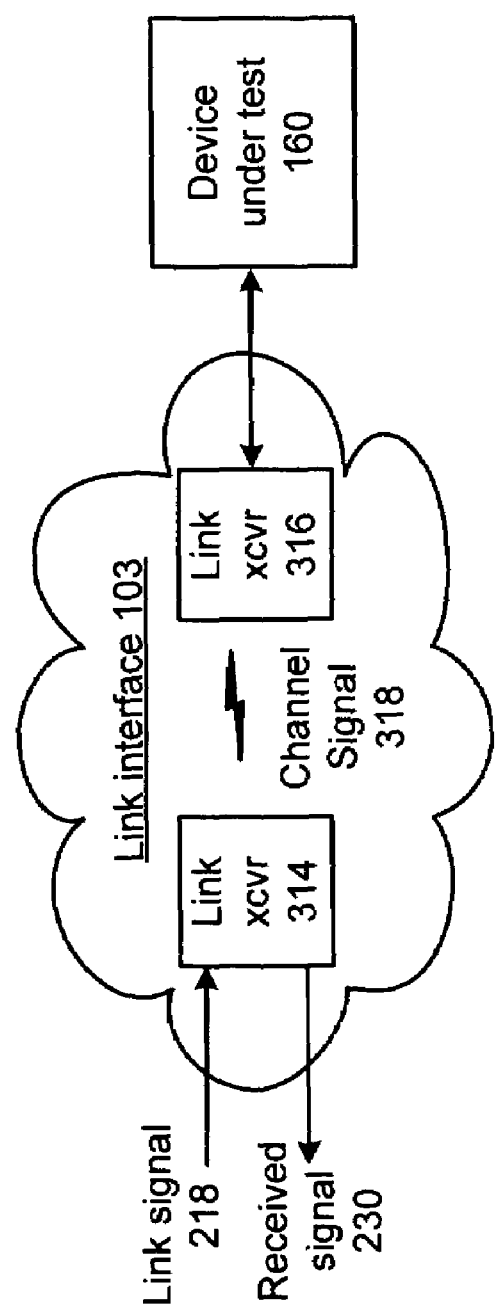

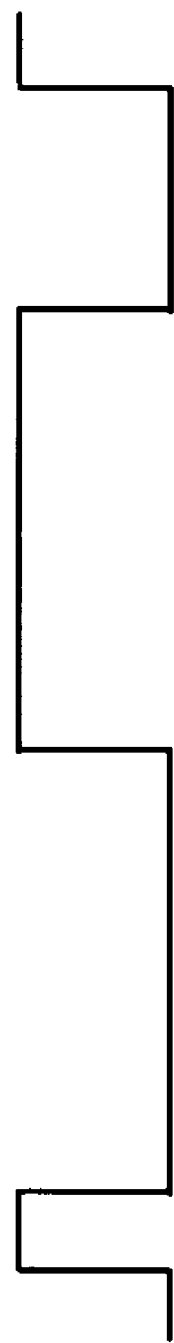

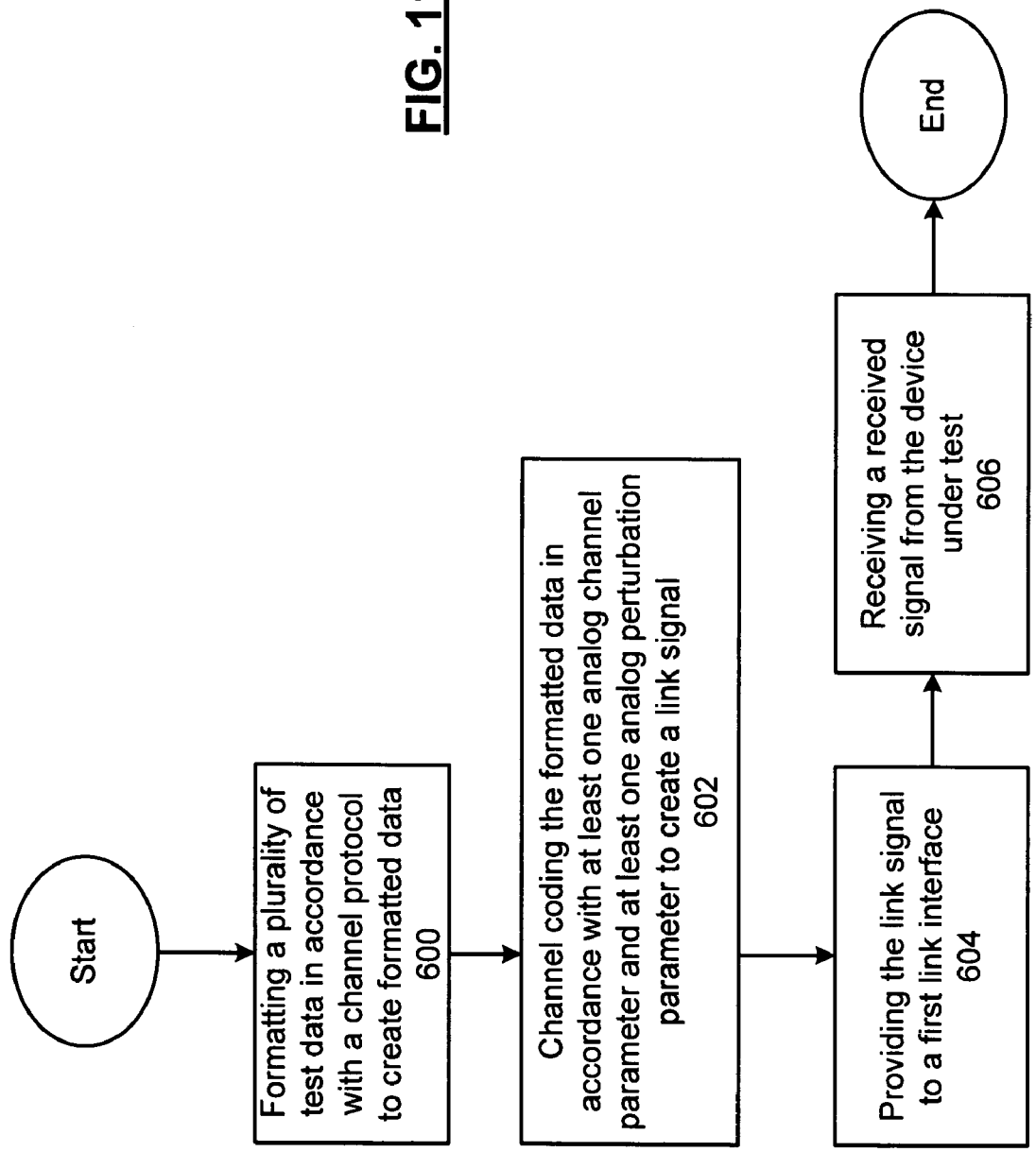

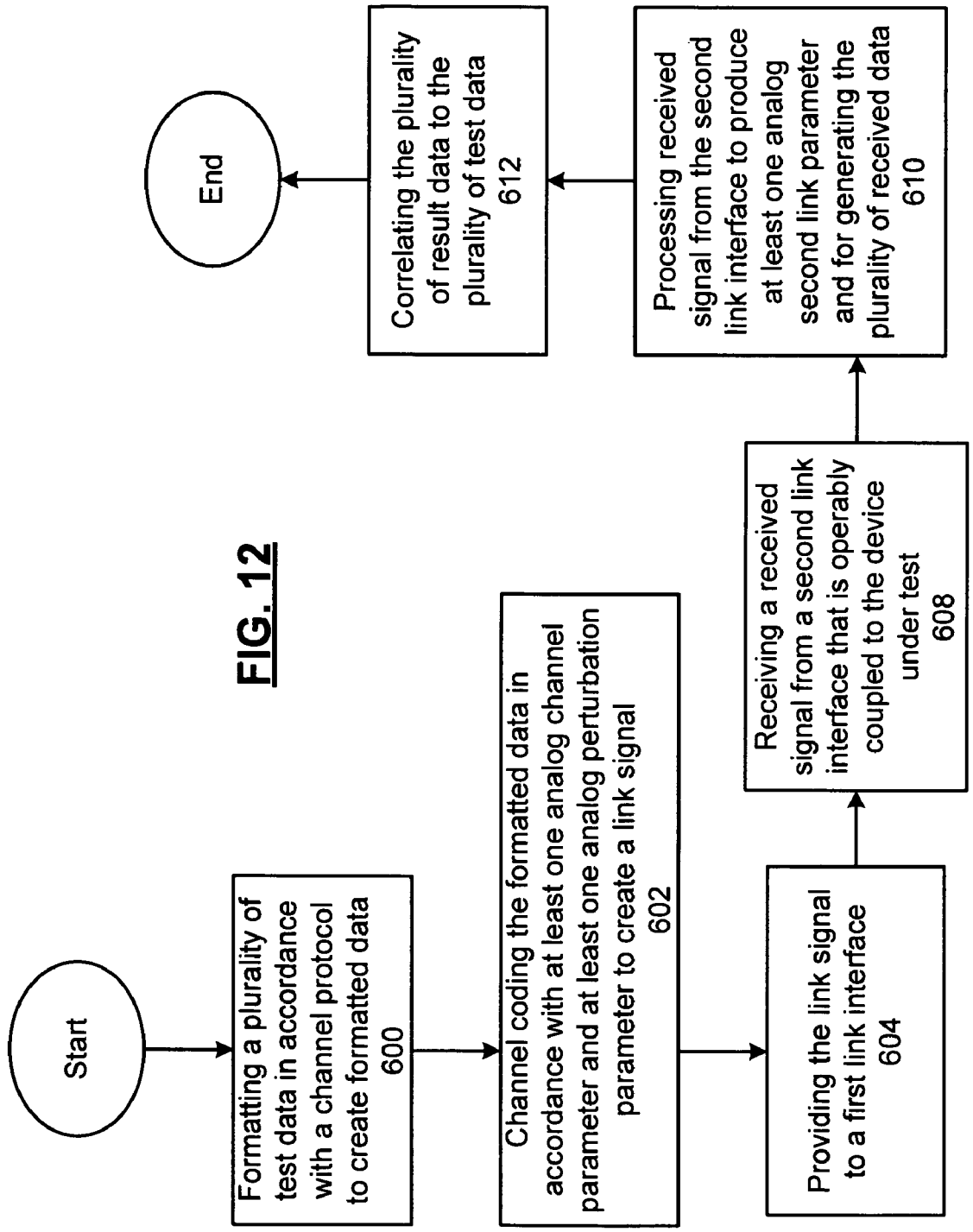

TEST SET FOR TESTING A DEVICE AND METHODS FOR USE THEREWITH

TECHNICAL FIELD OF THE INVENTION

The present invention relates to test sets used to test devices such as integrated circuits and related methods.

DESCRIPTION OF RELATED ART

As is known, integrated circuits are used in a wide variety of electronic equipment, including portable, or handheld, devices. Such handheld devices include personal digital assistants (PDA), CD players, MP3 players, DVD players, AM/FM radios, pagers, cellular telephones, computer memory extensions (commonly referred to as thumb drives), etc. Each of these handheld devices includes one or more integrated circuits to provide the functionality of the device. As an example, a handheld FM radio receiver may include multiple integrated circuits to support the reception and processing of broadcast radio signals in order to produce an audio output that is delivered to the user through speakers, headphones or the like. Many such integrated circuits include a processing device that executes a program that includes a sequence of instructions that are stored in a memory device.

One concern in the design of these integrated circuits is the testing and evaluation of the circuit's hardware and software to ensure that the device is properly performing the functions for which it was designed. The need exists for device testing procedures that can be implemented efficiently and that provide tests that accurately simulate and/or model potential channel conditions.

BRIEF DESCRIPTION OF THE SEVERAL VIEWS OF THE DRAWINGS

FIGS. 8-9 present block diagram representations in accordance with embodiments of the present invention.

FIG. 10 presents a graphical representation of an example link signal in accordance with an embodiment of the present invention.

FIG. 11 presents a method in accordance with an embodiment of the present invention.

FIG. 12 presents a method in accordance with an embodiment of the present invention.

DETAILED DESCRIPTION OF THE INVENTION INCLUDING THE PRESENTLY PREFERRED EMBODIMENTS

The embodiments of the present invention yield several advantages over the prior art. In an embodiment of the present invention, a test set is presented that is capable of testing multiple interfaces and multiple links of an integrated circuit. In a further embodiment of the present invention, a test set is presented that determines the effect of controlled variations of analog interface parameters as well as data inputs to an integrated circuit. In particular, these and other advantages will be evident to one of ordinary skill of the art, based on the teachings presented herein.

Figure 1:
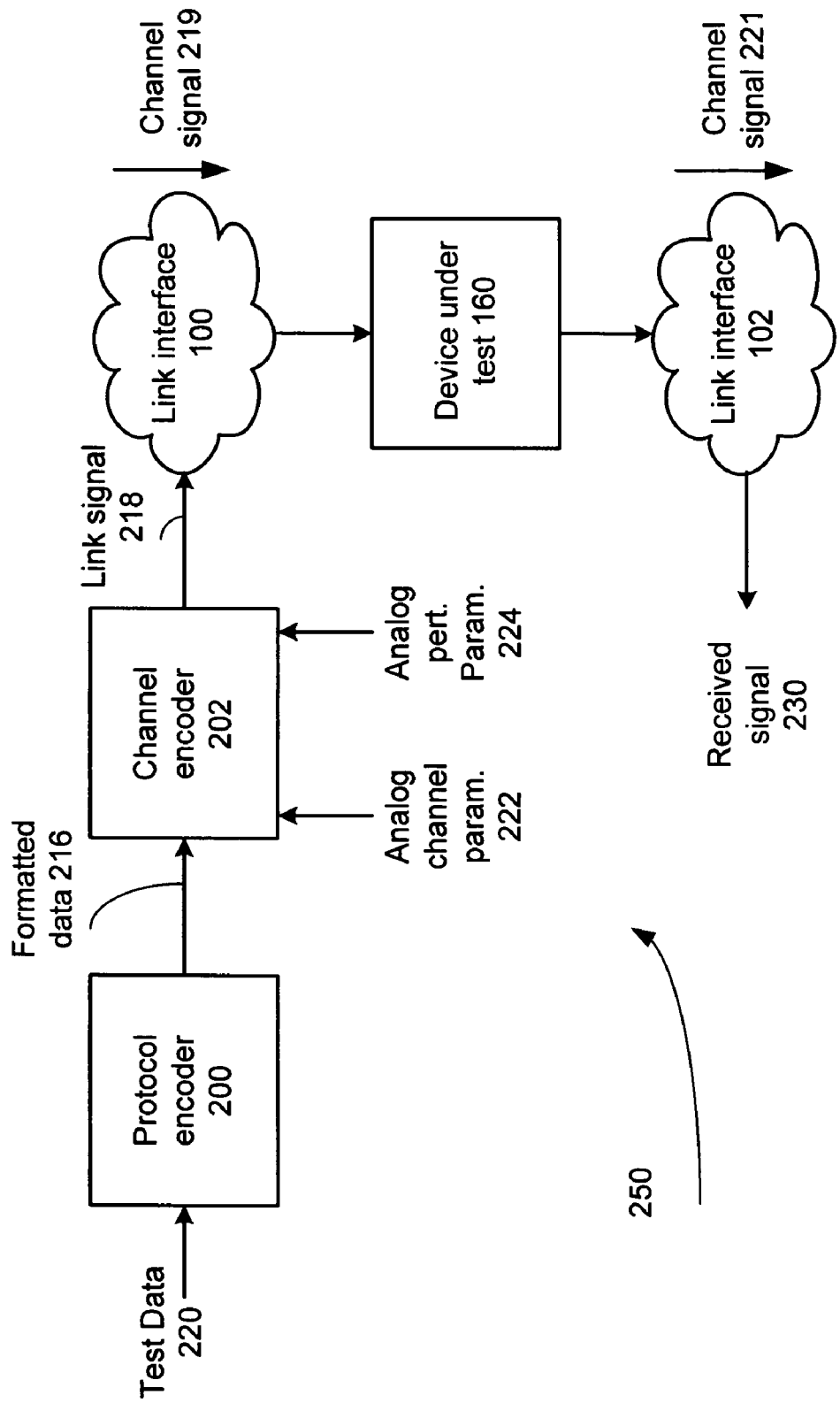
FIG. 1 presents a block diagram representation of a test set in accordance with an embodiment of the present invention.

FIG. 1 presents a block diagram representation of a test set in accordance with an embodiment of the present invention. In particular, test set 250 is presented for testing an device under test 160. Test set 250 includes a protocol encoder 200 for formatting a plurality of test data 220 in accordance with a channel protocol 200 to create formatted data 216. A channel encoder 202 is operably coupled to the protocol encoder for channel coding the formatted data 216 in accordance with at least one analog channel parameter 222 and at least one analog perturbation parameter 224 to form a link signal 218. A first link interface 100 is operably coupled to the channel encoder 202 and the device under test 160, for producing a channel signal 219. A second link interface 102 is operably coupled to the device under test 160 for generating a received signal 230 that is based on the channel signal 219. In particular, device under test 160 receives the channel signal 219 through the first interface 100 and generates a channel signal 221 in response that is transmitted through link interface 102 to produce received signal 230.

In an embodiment of the present invention, received signal 230 is directly based on channel signal 219 such that the data payload of the received signal 230, under ideal conditions, is identically the test data 220. In a further embodiment of the present invention, the data payload of received signal 230 includes data produced by device under test 160 in response to its receipt and processing of test data 220. In this fashion received signal 230 may include data that represents output data from a function, subroutine, application, acknowledgement or other action, process or procedure that is generated in response to test data 220. For instance, link interface 100 and link interface 102 may represent the transmit and receive path of a Universal Serial Bus (USB) 2.0 connection and received signal 230 may include an acknowledgement signal generated by the device under test in response to a setup command included in test data 220. Further, test data 220 may represent a received frequency modulated (FM) signal and received signal 230 may represent a demodulated and decoded audio channel generated from this FM signal. Test data 220 may represent control information, commands or other data from a master device, and the device under test may be a slave device that generates received signal 230 in response. These examples are merely illustrative of the many potential applications within the broad scope of the present invention.

In an embodiment of the present invention, the device under test 160 includes an integrated circuit, circuit board, system, network, electronic device, apparatus, or other device that can be coupled to link interfaces 100 and 102 to respond to channel signal 219 and to generate received signal 230. In an embodiment of the present invention the device under test 160 includes one or more of: a circuit board, system and network, that emulates the behavior of an integrated circuit.

In an embodiment of the present invention, link interfaces 100 and 102 can include a wired link in accordance with communications protocols such as RS232, Institute of Electrical and Electronics Engineers (IEEE) 488, Firewire, USB 1.1 or 2.0, SCSI, Fibre Channel, T1, Ethernet or other communication protocol, standard or otherwise. In addition, link interfaces 100 and 102 can include a wireless link in accordance with communications protocols such as 802.11x, Bluetooth, General Packet Radio Service (GPRS), PCS, Infrared Data Association (IrDA) or any other wireless communication protocol, standard or otherwise.

In an embodiment of the present invention, link interface 100 and link interface 102 are transmit and receive paths of a common bidirectional communication link. In a further embodiment, link interface 100 and link interface 102 include separate interfaces such as different communication channels.

In an embodiment of the present invention, test data 220 includes one or more data payloads that are formatted by protocol encoder 200 into formatted data 216 that corresponds to the format of link interface 100. This includes the creation of the appropriate frames, packets, and/or data streams that can include other related data such as control bits, error detection and/or correction codes, stuff/pad bits, timing and synchronization bits.

In an embodiment of the present invention, channel encoder 202 generates a link signal 218 such as a binary signal, that is based on the formatted data 216, and that is sufficient to drive link interface 100 to transmit the formatted data 216. Channel encoder 202 is responsive to at least one analog channel parameter of link interface 100, such as voltage swing (for instance, 0 to 3.3 Volts), rise time, fall time, and frequency. Channel encoder 202 is further responsive to at least one analog perturbation parameter 224 to modify the link signal 218 from ideal conditions in order to simulate and/or model the conditions of one of a plurality of non-ideal channels. In particular, the analog perturbation parameter 224 can include a frequency offset, a frequency drift, a frequency jitter, a noise signal corresponding to one of a plurality of noise types, a signal distortion, and a signal fading parameter that modulates, superimposes or otherwise modifies link signal 218 in this fashion to simulate and/or model the conditions of a real channel.

Figure 2:
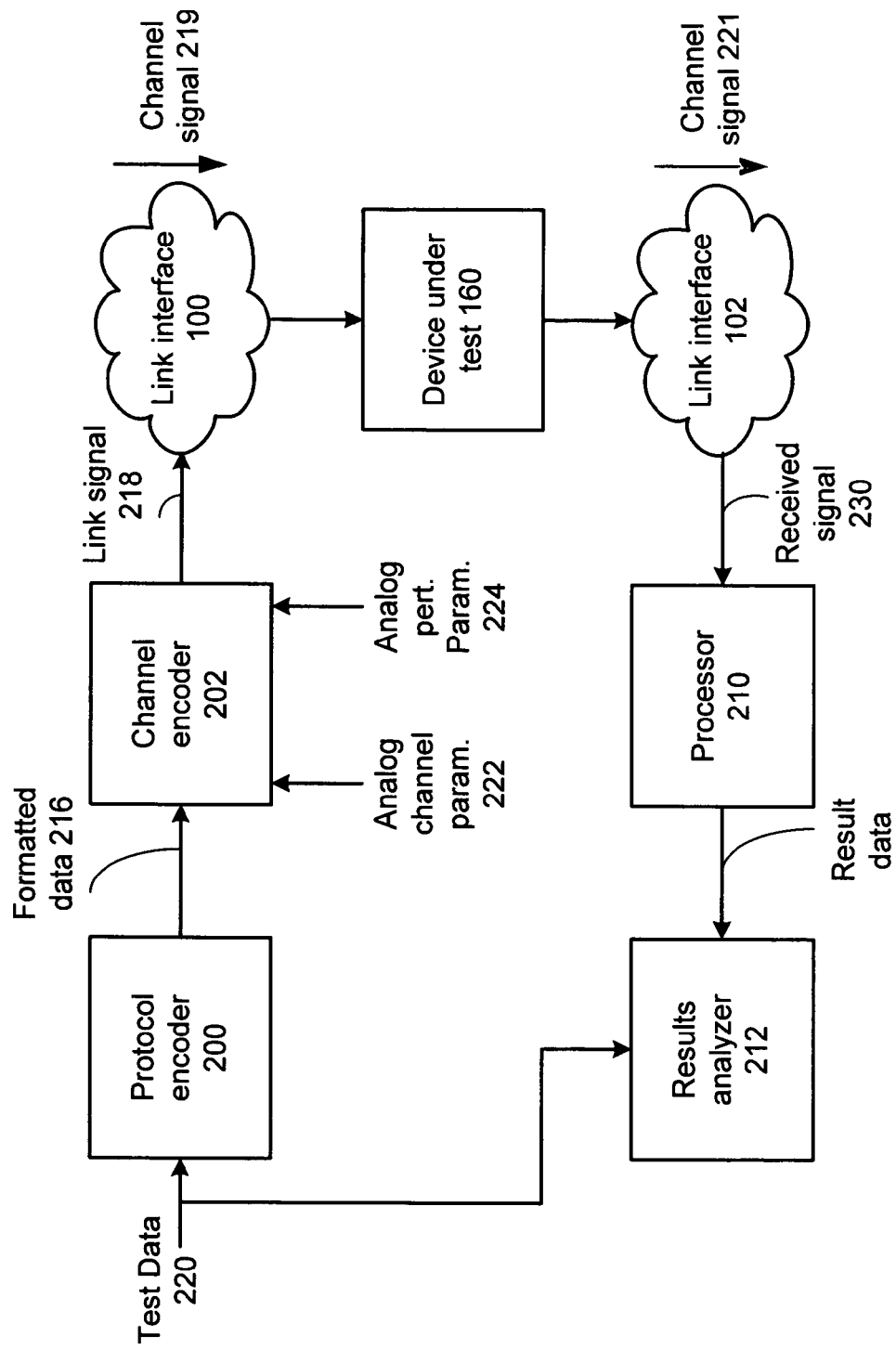
FIG. 2 presents a block diagram representation of a test set in accordance with an embodiment of the present invention.

FIG. 2 presents a block diagram representation of a test set in accordance with an embodiment of the present invention. In particular, a test set 260 is presented that includes many of the elements of test set 250. In addition, test set 260 includes a processor 210, operably coupled to the second link interface 102, for processing received signal 230 from the second link interface 102 to produce at least one analog second link parameter and for generating a plurality of result data 232. In particular, processor 210 analyzes the received signal to extract analog link parameters from the second link interface such as a clock frequency, a frequency drift, a frequency jitter, a received signal strength, a signal distortion, a signal fading parameter, and a signal to noise ratio or other analog signal parameter that can be used to gauge the performance of device under test 160.

In an embodiment of the present invention, processor 210 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions described herein.

Processor 210 further serves to sample the received signal 230, and extract the data payload in the form of a plurality of result data 232. Test set 260 further includes a results analyzer 212, operably coupled to the processor 210, for correlating the plurality of result data 232 to the plurality of test data 220. In an embodiment of the present invention where device under test 160 is a bridge device that converts data from a first communications protocol corresponding to a first link interface 100 into data in a second communications protocol corresponding to a second link interface 102, the result data 232 can be correlated to the test data 220 by directly comparing results data 232 to test data 220 to determine one or more factors such as the number of errors, and/or the types of errors that have been introduced by the device under test 160 in conjunction with link interfaces 100 and 102. In an alternative embodiment of the present invention, result data 232 is correlated to the test data 220 by comparing the result data 232 with ideal or expected result data that would result by the proper operation of device under test 160 in the absence of any errors or other disturbances or by otherwise determining a value, score, metric, summary, or report that is based on test data 220.

Protocol encoder 200, channel encoder 202 and results analyzer 212 may be implemented in hardware, software or firmware. While each of these modules are represented separately and separate from processor 210, each module can optionally be implemented as a software module executed by processor 210 or executed by a separate processor (not specifically shown).

Figure 3:
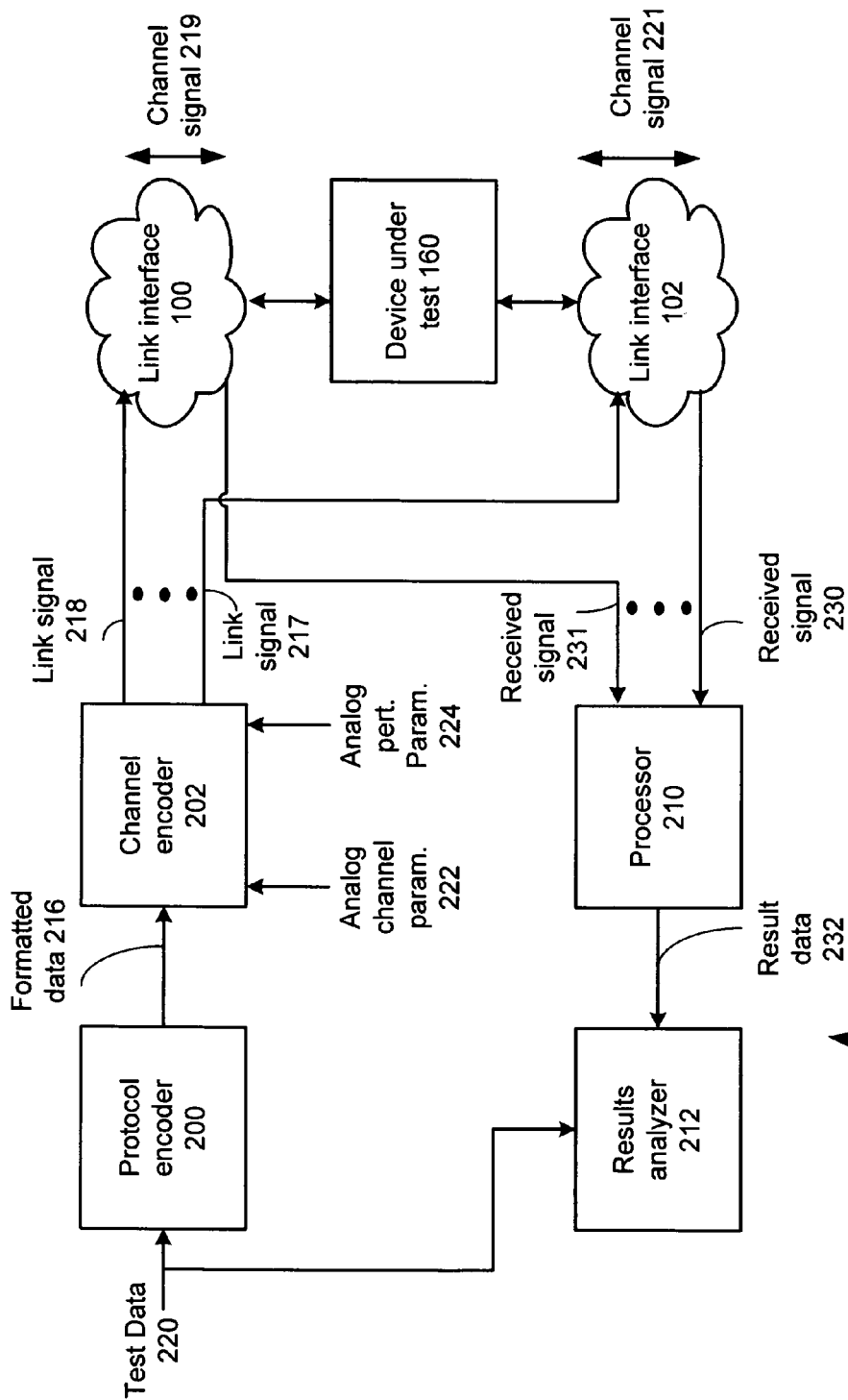
FIG. 3 presents a block diagram representation of a test set in accordance with an embodiment of the present invention.

FIG. 3 presents a block diagram representation of a test set in accordance with an embodiment of the present invention. In particular, a test set 270 is presented that includes many of the elements of test sets 250 and 260. In this embodiment, link interfaces 100 and 102 are both bidirectional links with channel signals 221 and 219 capable of bidirectional flow. Test data 220 is used to test device under test 160 from two paths: from link interface 100 to device under test 160 to link interface 102 via link signal 218 and received signal 230; and from link interface 102 to device under test 160 to link interface 100 via link signal 217 and received signal 231. In this fashion the transmit and receive functionality of device under test 160 can likewise be tested for both link interfaces 100 and 102. While two link interfaces are shown with a single link signal and a single received signal, other configurations involving more than two link interfaces with multiple paths, multiple link signals 217, 218, . . . and/or multiple received signals, 230, 231, . . . and/or multiple devices under test are likewise possible within the broad scope of the present invention.

Figure 4:
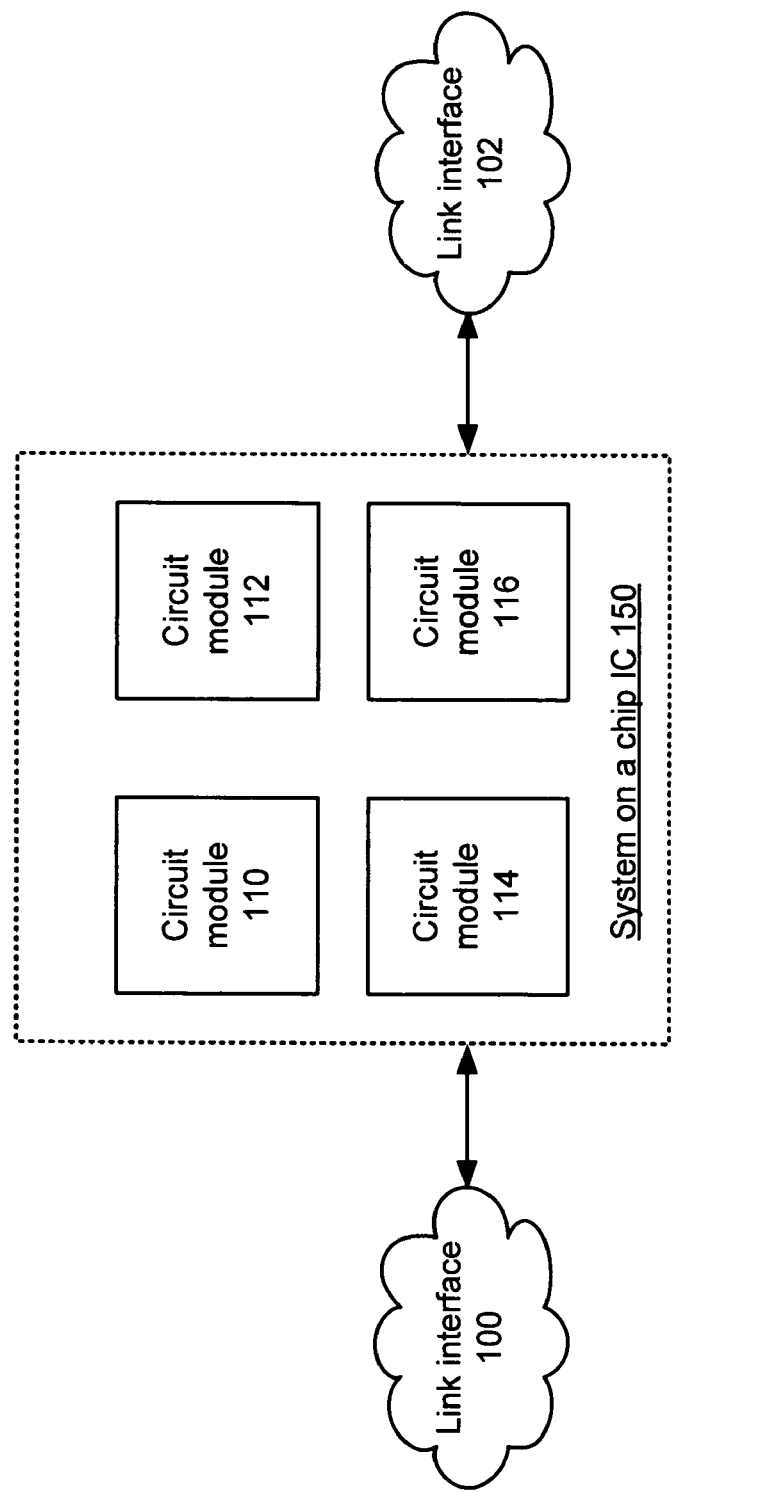
FIG. 4 presents a block diagram representation of a system on a chip integrated circuit in accordance with an embodiment of the present invention.

FIG. 4 presents a block diagram representation of a system on a chip integrated circuit in accordance with an embodiment of the present invention. In particular, the device under test 160 under test includes a system on a chip integrated circuit 150. In an embodiment of the present invention, system on a chip integrated circuit 150 includes one or more circuit modules 110, 112, 114 and 116. In an embodiment of the present invention, at least one circuit module is included in an analog portion of system on a chip integrated circuit 150 and at least one circuit module is included on a digital portion of system on a chip integrated circuit 150. Examples of such circuit modules can include mixing modules, phase locked loops, frequency synthesizers, signal encoders and decoders, signal compression and decompression modules, analog to digital converters, digital to analog converters, signal generators, input and output processing modules, speech synthesis modules, text-to-speech conversion modules, speech recognition modules, audio playback units, digital filters, downsampling modules, switched capacitor circuits, digital sampling modules, and other circuit modules used in the processing of digital, analog, discrete time and mixed signal circuits.

Figure 5:
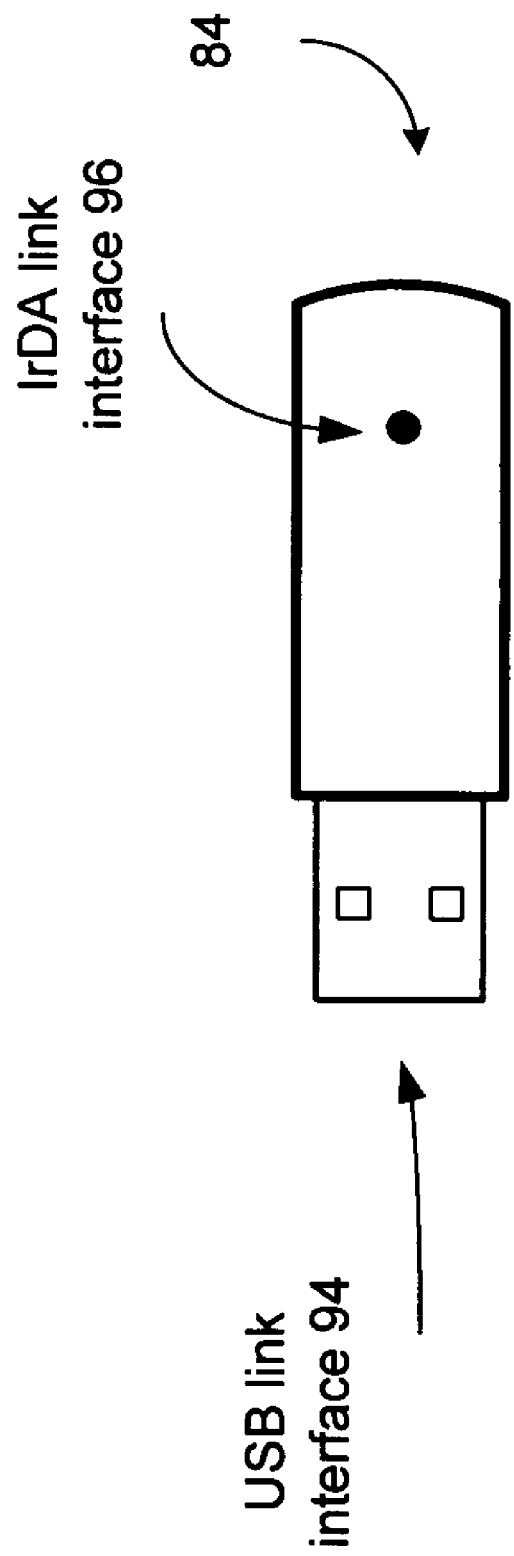
FIG. 5 presents a pictorial diagram of a IrDA bridge device 84 in accordance with an embodiment of the present invention.

FIG. 5 presents a pictorial diagram of a IrDA bridge device 84 in accordance with an embodiment of the present invention. In an embodiment, system on a chip integrated circuit 150 is implemented in IrDA bridge device 84. In particular, link interface 100 includes an IrDA link interface 96 and a link interface 102 include a USB 2.0 link interface 94 and the device under test bidirectionally transmits data from IrDA to USB 2.0 and vice versa.

Figure 7:
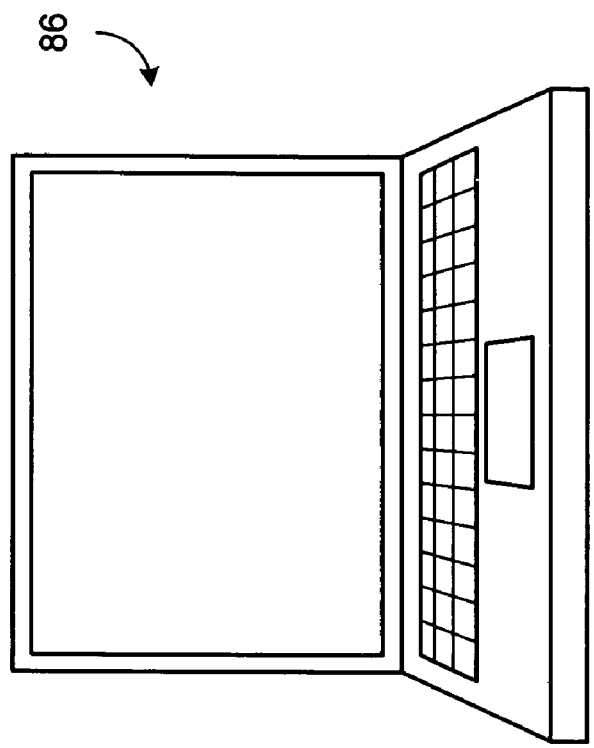
FIGS. 6-7 present pictorial diagrams of other devices in accordance with embodiments of the present invention
Figure 6:
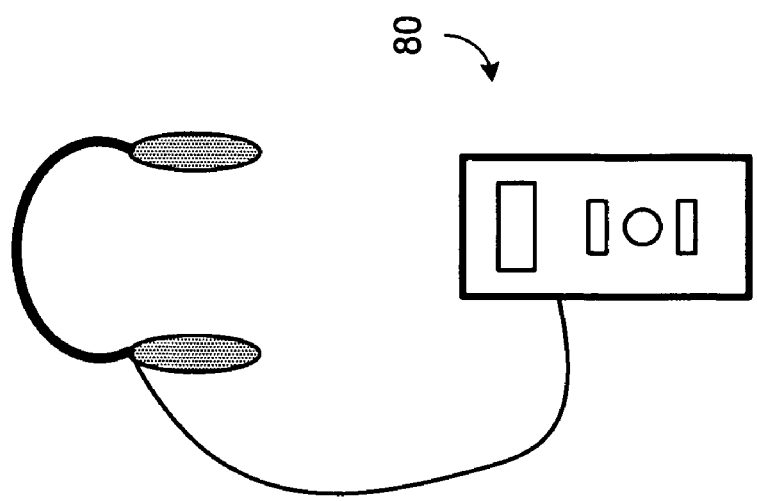

FIGS. 6-7 present pictorial diagrams of other devices in accordance with embodiments of the present invention. In particular, system on a chip integrated circuit 150 may be designed to perform one or more functions on handheld audio device 80 such as radio receiver, MP3 player, personal digital assistant, wireless telephone or other handheld device or one or more functions of computer 86. While these applications of system on a chip 150 are illustrative, other applications are likewise possible within the broad scope of the present invention.

FIGS. 8-9 present block diagram representations in accordance with embodiments of the present invention. In particular link interfaces 101 and 103 are presented that each may implement either link interface 100 or link interface 102. Link interface 101 presents a wired link that communicates a bidirectional channel signal 308 between link drivers 304 and 306. Link signal 218 is provided to link driver 304 and received signal 230 is received from link driver 304. Link driver 306 provides a coupling to and from device under test 160. Link interface 103 presents a wireless link that communicates a bidirectional channel signal 318 between link transceivers 314 and 316. Link signal 218 is provided to link transceiver 314 and received signal 230 is received from link transceiver 314. Link transceiver 316 provides a coupling to and from device under test 160.

FIG. 10 presents a graphical representation of an example link signal in accordance with an embodiment of the present invention. In this embodiment, channel encoder 202 includes a Huffman coder that codes the formatted data 216 into link signal 218. In this embodiment, link signal 218 is a binary signal that alternates between high and low values with run lengths that are a discrete number of sample periods in length. In an embodiment of the present invention, the sample periods used by the Huffman coder are smaller than the period of the data transmitted over link interface 100 or 102, such that the rising and/or falling edge of a data pulse may be advanced or retarded in order to implement jitter in the link signal 218.

FIG. 11 presents a method in accordance with an embodiment of the present invention. In particular, a method is presented for use with some or all of the features and functions described in conjunction with FIGS. 1-10. The method begins in step 600 by formatting a plurality of test data in accordance with a channel protocol to create formatted data. In step 602 the formatted data is channel coded in accordance with at least one analog channel parameter and at least one analog perturbation parameter to form a link signal. In step 604, the link signal is provided to a first link interface that is operably coupled to an integrated circuit. In step 606, a received signal is received from the device under test.

In an embodiment of the present invention, the received signal is received from a link interface such as a received channel from the first link interface or from a second link interface. In an alternative embodiment of the present invention, the received signal is received in some other fashion from the device under test. For instance, if the device under test includes an integrated circuit, the received signal may be gathered by connecting to one or more pins that are external to the integrated circuit or by probing one or more points internal to the integrated circuit, or by extracting the received signal by other means.

FIG. 12 presents a method in accordance with an embodiment of the present invention. In particular, a method is presented for use with some or all of the features and functions described in conjunction with FIGS. 1-10 and includes steps 600, 602 and 604 from FIG. 11. In step 608, a received signal is received from a second link interface that is operably coupled to the device under test. In step 610, the received signal from the second link interface is processed to produce at least one analog second link parameter and for generating the plurality of received data. In step 612, the plurality of result data are correlated to the plurality of test data.

In preferred embodiments, the various circuit components are implemented using 0.35 micron or smaller CMOS technology. Provided however that other circuit technologies, both integrated or non-integrated, may be used within the broad scope of the present invention. Likewise, various embodiments described herein can also be implemented as hardware devices, firmware, software programs running on a computer processor and/or network infrastructure. It should also be noted that the software implementations of the present invention can be stored on a tangible storage medium such as a magnetic or optical disk, read-only memory or random access memory and also be produced as an article of manufacture.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Thus, there has been described herein an apparatus and method, as well as several embodiments including a preferred embodiment, for implementing a test set for testing an integrated circuit such as a system on a chip integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A test set for testing an integrated circuit, the test set comprising:
   a protocol encoder for formatting a plurality of test data in accordance with a channel protocol to create formatted data;
   a channel encoder, operably coupled to the protocol encoder, for channel coding the formatted data in accordance with at least one analog channel parameter and at least one analog perturbation parameter to form a link signal;
   a first link interface, operably coupled to the channel encoder and the integrated circuit, for producing a channel signal that is coupled to the integrated circuit;
   a second link interface, operably coupled to the integrated circuit, for producing a received signal that is based on the channel signal;
   a processor, operably coupled to the second link interface, for processing a received signal from the second link interface to produce at least one analog second link parameter and for generating a plurality of result data; and
   a results analyzer, operably coupled to the processor, for correlating the plurality of result data to the plurality of test data.

2. The test set of claim 1 wherein the channel encoder Huffman codes the formatted data.

3. The test set of claim 1 wherein the at least one analog second link parameter includes one of: a clock frequency, a frequency drift, a frequency jitter, a received signal strength, a signal distortion, a signal fading parameter, and a signal to noise ratio.

4. The test set of claim 1 wherein, one of the first link interface, and the second link interface, includes a wireless link.

5. The test set of claim 4 wherein the wireless link includes an Infrared Data Association (IrDA) coupling.

6. The test set of claim 1 wherein, one of the first link interface, and the second link interface, includes a wired link.

7. The test set of claim 6 wherein the wired link includes a Universal Serial Bus (USB) coupling.

8. The test set of claim 1 wherein the at least one analog perturbation parameter includes one of: a frequency offset, a frequency drift, a frequency jitter, a noise signal, a signal distortion, and a signal fading parameter.

9. A test set for testing a device, the test set comprising:
   a protocol encoder for formatting a plurality of test data in accordance with a channel protocol to create formatted data;
   a channel encoder, operably coupled to the protocol encoder, for channel coding the formatted data in accordance with at least one analog channel parameter and at least one analog perturbation parameter to form a link signal;
   a first link interface, operably coupled to the channel encoder and the device, for producing a channel signal that is coupled to the device; and
   a second link interface, operably coupled to the device, for generating a received signal that is based on the channel signal.

10. The test set of claim 9 further comprising:
    a processor, operably coupled to the second link interface, for processing a received signal from the second link interface to produce at least one analog second link parameter and for generating a plurality of result data.

11. The test set of claim 10 further comprising:
    a results analyzer, operably coupled to the processor, for correlating the plurality of result data to the plurality of test data.

12. The test set of claim 10 wherein the at least one analog second link parameter includes one of: a clock frequency, a frequency drift, a frequency jitter, a received signal strength, a signal distortion, a signal fading parameter, and a signal to noise ratio.

13. The test set of claim 9 wherein the channel encoder Huffman codes the formatted data.

14. The test set of claim 9 wherein, one of the first link interface, and the second link interface, includes a wireless link.

15. The test set of claim 14 wherein the wireless link includes an Infrared Data Association (IrDA) coupling.

16. The test set of claim 9 wherein, one of the first link interface, and the second link interface, includes a wired link.

17. The test set of claim 16 wherein the wired link includes a Universal Serial Bus (USB) coupling.

18. The test set of claim 9 wherein the at least one analog perturbation parameter includes one of: a frequency offset, a frequency drift, a frequency jitter, a noise signal, a signal distortion, and a signal fading parameter.

19. The test set of claim 9 wherein the device includes a system on a chip integrated circuit.

20. The test set of claim 9 wherein the device includes at least one of: a circuit board, system and network, that emulates a behavior of an integrated circuit.

21. A method comprising:
    formatting a plurality of test data in accordance with a channel protocol to create formatted data;
    channel coding the formatted data in accordance with at least one analog channel parameter and at least one analog perturbation parameter to form a plurality of first link data;

providing the first link data to a first link interface that is operably coupled to a device; and receiving a received signal from the device.

22. The method of claim 21 wherein the step of channel coding the formatted data includes Huffman coding the formatted data.

23. The method of claim 21 wherein the step of receiving includes receiving a received signal from a second link interface that is operably coupled to the device.

24. The method of claim 23 further comprising:

processing received signal from the second link interface to produce at least one analog second link parameter and for generating a plurality of result data.

25. The method of claim 24 wherein the at least one analog second link parameter includes one of: a clock frequency, a frequency drift, a frequency jitter, a received signal strength, a signal distortion, a signal fading parameter, and a signal to noise ratio.

26. The method of claim 24 further comprising:

correlating the plurality of result data to the plurality of test data.

27. The method of claim 23 wherein, one of the first link interface, and the second link interface, includes a wireless link.

28. The method of claim 27 wherein the wireless link includes an Infrared Data Association (IrDA) coupling.

29. The method of claim 23 wherein, one of the first link interface, and the second link interface, includes a wired link.

30. The method of claim 29 wherein the wired link includes a Universal Serial Bus (USB) coupling.

31. The method of claim 21 wherein the at least one analog perturbation parameter includes one of: a frequency offset, a frequency drift, a frequency jitter, a noise signal, a signal distortion, and a signal fading parameter.

* * * * *